United States Patent [19]
Moore, Sr.

[11] Patent Number: 5,375,474
[45] Date of Patent: Dec. 27, 1994

[54] COMPENSATED HIGH TEMPERATURE STRAIN GAGE

[75] Inventor: Thomas C. Moore, Sr., Poquoson, Va.

[73] Assignee: The United States of America as represented by the United States National Aeronautics and Space Administration, Washington, D.C.

[21] Appl. No.: 928,865

[22] Filed: Aug. 12, 1992

[51] Int. Cl.$^5$ .............................................. G01B 7/16
[52] U.S. Cl. ........................................ 73/766; 73/775; 29/621.1
[58] Field of Search ................. 73/766, 775; 29/621.1; 427/223; 139/420 R

[56] References Cited

U.S. PATENT DOCUMENTS

| | | | |
|---|---|---|---|
| 2,344,642 | 3/1944 | Ruge | 73/766 X |
| 2,626,338 | 1/1953 | Mitchell | 73/775 X |
| 3,314,033 | 4/1967 | Wnuk, Jr. | 29/621.1 X |
| 4,707,399 | 11/1987 | Rambosek | 139/420 R X |

Primary Examiner—Hezron E. Williams
Assistant Examiner—James M. Olsen
Attorney, Agent, or Firm—Kimberly A. Chasteen

[57] ABSTRACT

A device for measuring strain in substrates at high temperatures in which the thermally induced apparent strain is nulled. Two gages are used, one active gage and one compensating gage. Both gages are placed on the substrate to be gaged; the active gage is attached such that it responds to mechanical and thermally induced apparent strain while the compensating gage is attached such that it does not respond to mechanical strain and measures only thermally induced apparent strain. A thermal blanket is placed over the two gages to maintain the gages at the same temperature. The two gages are wired as adjacent arms of a Wheatstone bridge which nulls the thermally induced apparent strain giving a true reading of the mechanical strain in the substrate.

10 Claims, 3 Drawing Sheets

COMPENSATED HIGH TEMPERATURE STRAIN GAGE

ORIGIN OF THE INVENTION

The invention described herein was made by employees of the United States Government and may be used by and for the Government for governmental purposes without the payment of any royalties thereon or therefor.

TECHNICAL FIELD OF THE INVENTION

The present invention relates generally to strain gages, and more particularly to compensated strain gages for use in high temperatures.

BACKGROUND OF THE INVENTION

Several popular high temperature strain gages employ various alloys of iron, chromium and aluminum (FeCrAl) whose "apparent strain", output due to resistance change versus temperature when no thermal or mechanical strain is present, is the dominant output for these type strain gages. These gages have been typically installed as one arm of a Wheatstone bridge and when the bonded strain gage is strained (elongated or compressed) the gage resistance changes as a function of the strain. This strain is then converted into an output signal representative of the magnitude of the strain. The indicated output due to apparent strain resulting from a temperature change is usually far greater than the resistance change generated due to mechanical strains. Additionally, the resistance change is non-linear, non-repeatable, and drifts with time at elevated temperatures.

Various types of strain gages are known which compensate for apparent strain caused by high temperatures. One apparatus incorporates temperature sensitive wire in the same arm of the bridge circuit as the active strain gage or in an adjacent arm of the bridge circuit. This apparatus corrects the thermal output but only at one temperature due to the non-linear thermal coefficient of resistance of the high temperature alloyed wire from which high temperature strain gages are constructed. Another technique involves installing a strain gage identical to the active strain gage on a test block and wiring the adjacent arm to the active gage while attempting to subject both gages to the same temperature. Maintaining both gages at the same temperature is virtually impossible so that the apparent strain induced by temperature as read by the test block gage and that induced in the active gage are not the same.

It is accordingly an object of the present invention to provide a compensated strain gage which can correct temperature-induced errors associated with gages which can function at temperatures above 370° C.

It is another object of the present invention to provide a compensated strain gage in which the compensating gage is maintained at precisely the same temperature as the active strain gage.

It is another object of the present invention to provide a compensating gage which does not respond to mechanical strain.

It is another object of the present invention to provide a compensated strain gage which is effective over a range of temperatures.

It is another object of the present invention to achieve the foregoing objects in a simple manner.

Additional objects and advantages of the present invention are apparent from the drawings and specification which follow.

SUMMARY OF THE INVENTION

According to the present invention, the foregoing and additional objects are obtained by providing a compensated high temperature strain gage which consists of an active strain gage and a compensating strain gage. An electrically insulating layer is placed on the substrate to be gaged. This layer may be flame sprayed $Al_2O_3$ or a non-electrically conducting ceramic cement. The active gage is mounted on the insulating layer using flame sprayed $Al_2O_3$ or a non-electrically conducting ceramic cement such that it responds to mechanical strains caused in the substrate. The compensating gage is tack bonded to the insulating layer in immediate proximity to the active strain gage using a flame spray system or a non-electrically conducting ceramic cement such that it does not respond to mechanical strains caused in the substrate. The compensating gage is configured such that it surrounds the active gage on three sides when both gages are mounted on the substrate. The two gages are maintained at the same temperature by, for example, placing a high temperature thermal blanket made from a woven Alumina-Boria-Silica fiber cloth over both gages and flame spraying the outer surface of the thermal blanket with $Al_2O_3$. The two gages are wired as adjacent arms of a Wheatstone bridge such that apparent strain is nulled.

DETAILED DESCRIPTION OF THE INVENTION

The compensated strain gage described below operates on the well-known theory that if the resistance in adjacent arms of a Wheatstone bridge remain equal to each other, the output remains nulled and, if strain gages subject to identical strains are placed in adjacent arms of the bridge, the output signal remains nulled. If one of the strain gages measures only apparent strain while the other measures apparent and mechanical strain, assuming that the strain gages are subject to the same apparent strain, the apparent strain in each gage is nulled so that only the mechanical strain is measured.

Figure 1:
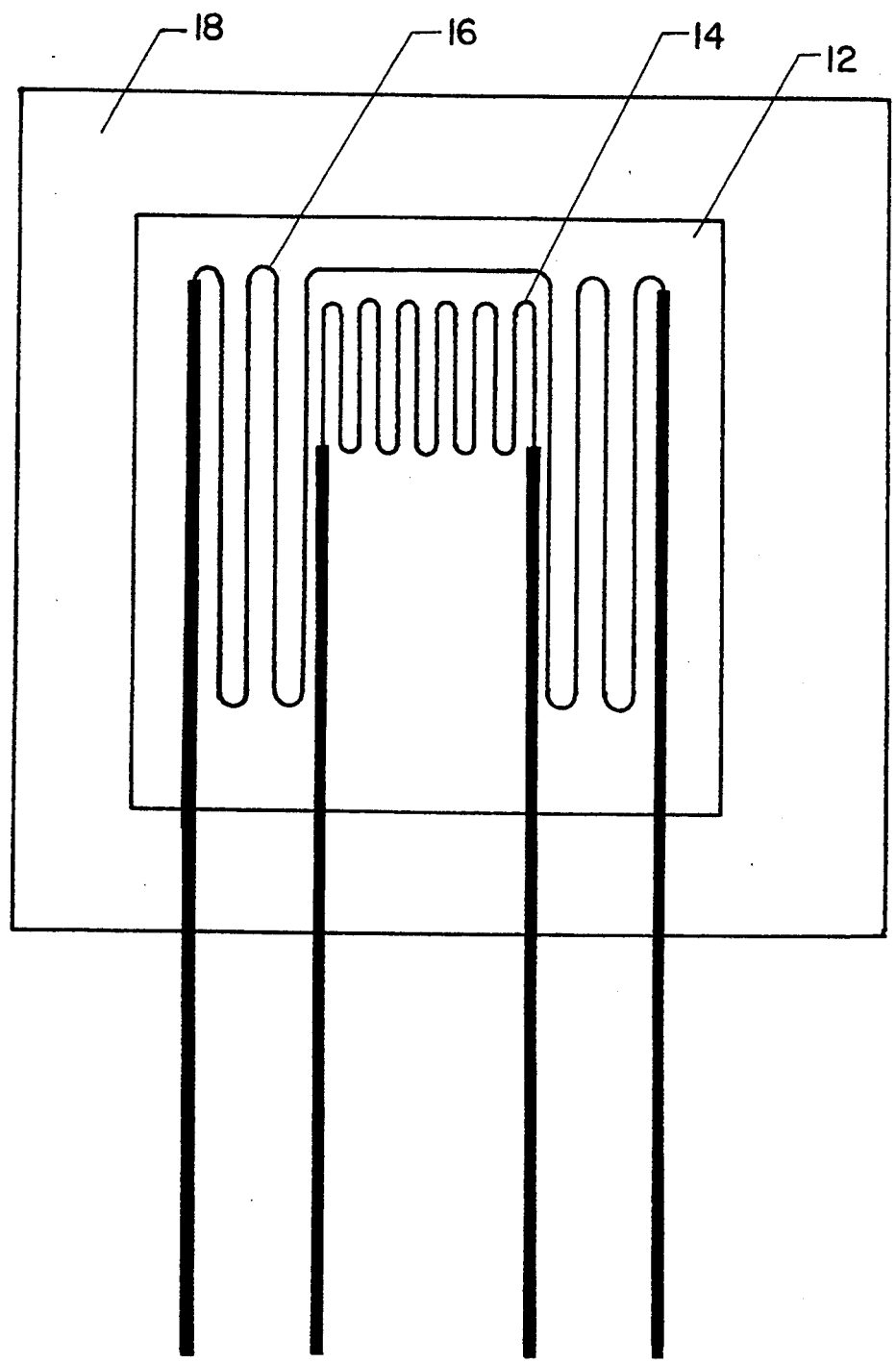
FIG. 1 is a top view of an unassembled gage.
Figure 2:
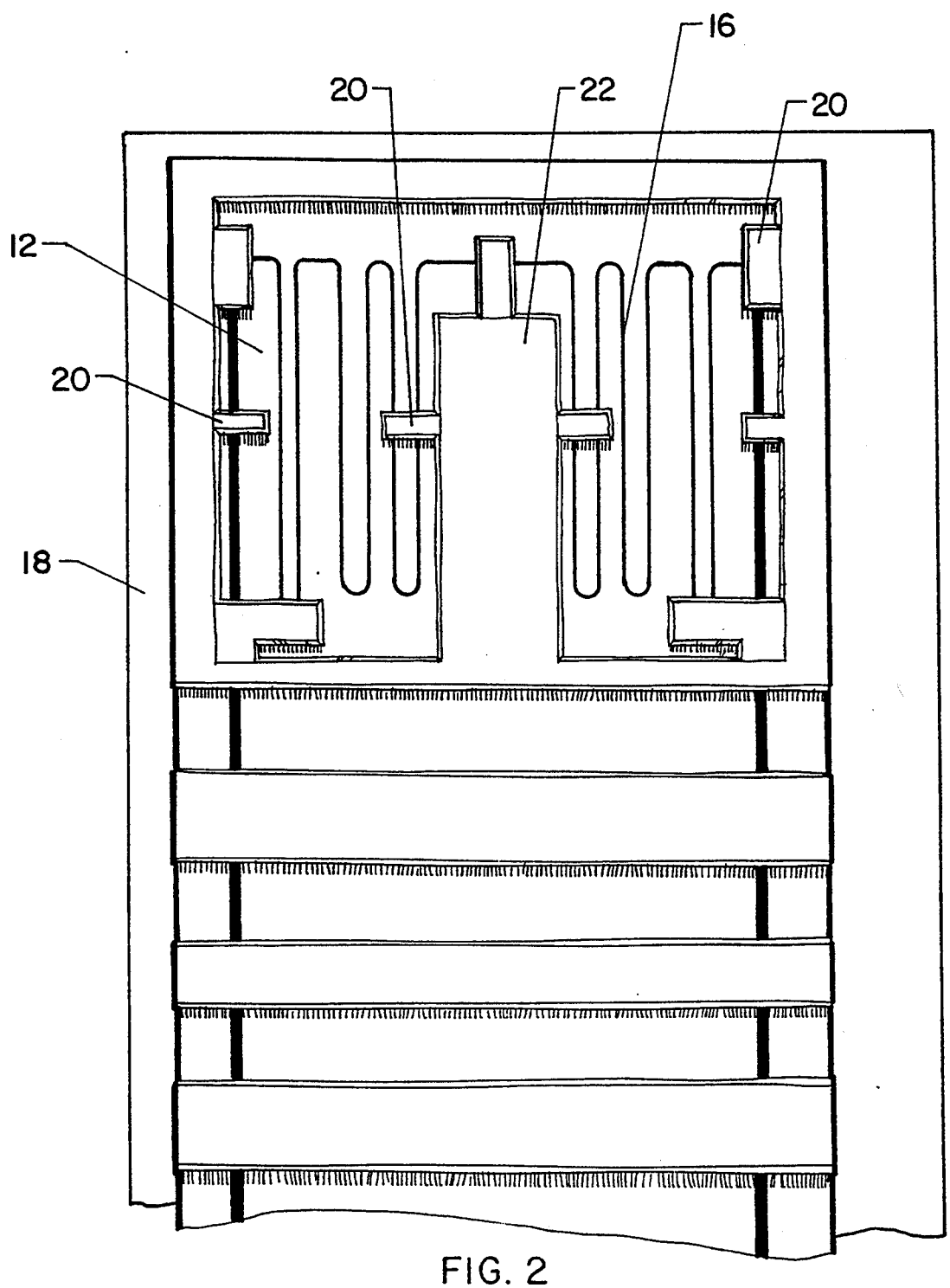
FIG. 2 is a top view of a partially assembled gage.
Figure 3:
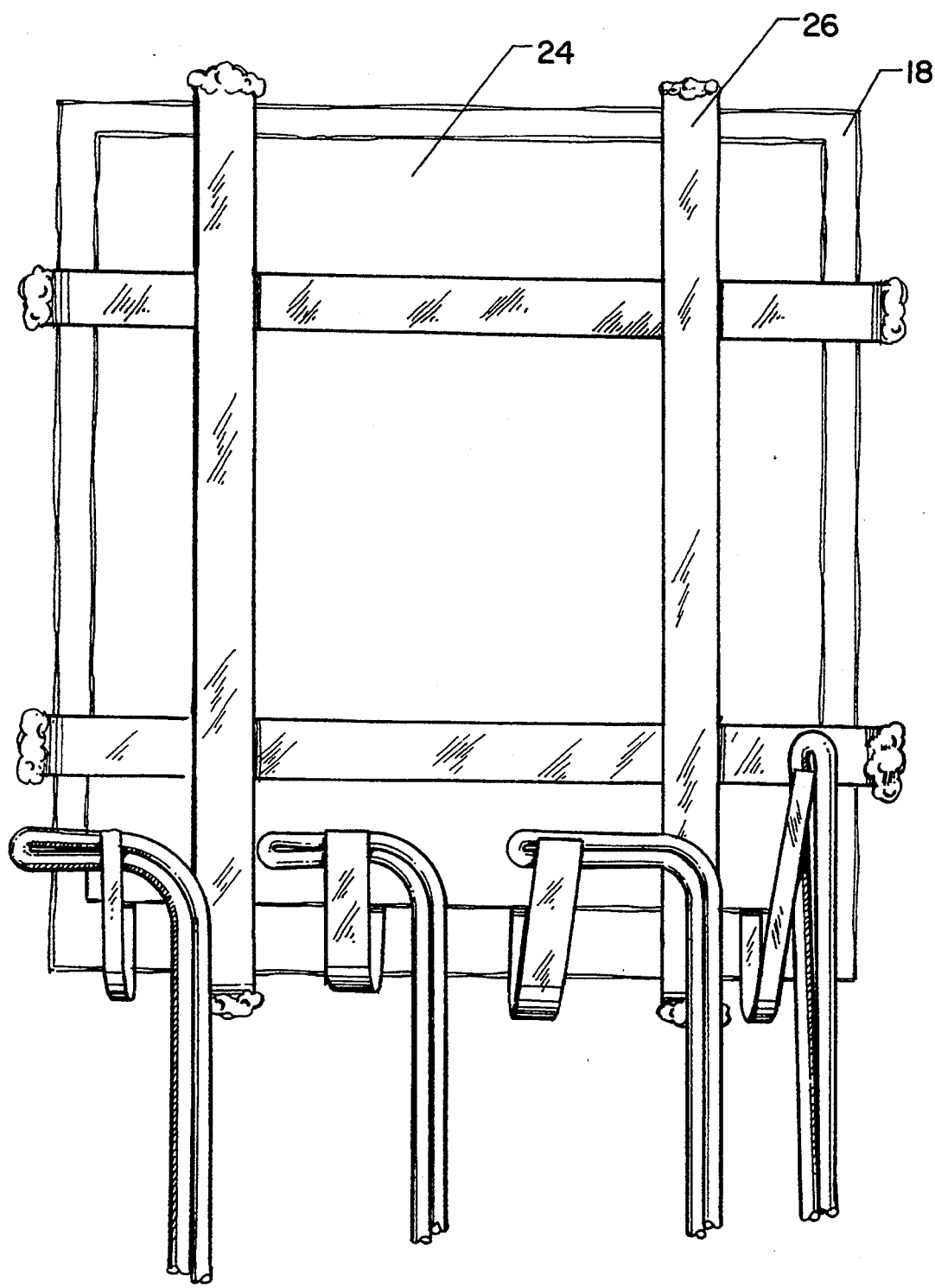
FIG. 3 is a top view of an assembled gage.

The compensated strain gage is constructed as follows. An electrically insulating layer of $Al_2O_3$ 12 approximately 0.075 mm thick and of sufficient area to contain the active gage 14 and the compensating gage 16 is applied to the substrate 18 to be gaged (see FIG. 1). The active gage 14, formed from a high temperature strain gage alloy, is placed on the $Al_2O_3$ layer 12 and bonded to the substrate 18 using a flame spray system or by using an appropriate ceramic cement. The compensating strain gage 16 is formed from the same high temperature strain gage alloy that comprises the active strain gage 14, and is configured such that it will surround the active strain gage 14 on three sides. The compensating gage 16 is also placed on the $Al_2O_3$ layer 12 surrounding the active gage 14 and is tack-bonded 20 to the substrate 18 such that it is not subjected to mechanical strain. The bonding of the active strain gage 14 to the substrate 18 is accomplished either by flame spraying a layer of $Al_2O_3$ 22 over the active gage 14 or through the application of a ceramic cement. This bonding of the active gage to the substrate allows the active gage to respond to mechanical strains. The compensating gage 16, which has only been tack-bonded in a few locations 20, could change temperature at a rate different from that of the encapsulated active gage under high heating or cooling rates. To prevent this, both gages are covered by a thermal blanket 24. The exposed surface of this blanket 24 is flame sprayed with $Al_2O_3$ to improve its thermal characteristics. The blanket 24 is then secured in place over the strain gaged area by bonding its edges to the surface or by implementing straps 26 over the blanket 24 which are then spotwelded or bonded to the substrate 18 around the strain gaged area. Because the compensating gage 16 is on the same substrate material 18 and at the same relative height above the test surface as the active gage 14 and, because the surface coating of the thermal blanket 24 is of the same material as that used in bonding the active gage 14, both gages are subjected to the same rate of temperature change even when moderately high heat fluxes are encountered and wiring the two gages into adjacent arms of a Wheatstone Bridge Circuit nulls the gages at any temperature.

What is claimed is:

1. A compensated high temperature strain gage for measuring strain in a substrate, comprising:
   an active strain gage;
   a compensating strain gage;
   an electrically insulating layer placed on the substrate;
   the active gage mounted on the insulating layer such that the active gage responds to mechanical strains caused in the substrate;
   the compensating gage mounted on the insulating layer in immediate proximity to the active strain gage such that it does not respond to mechanical strains caused in the substrate and such that the compensating gage surrounds the active gage on three sides;
   a means for maintaining the two gages at the identical temperature; and
   the two gages wired as adjacent arms of a Wheatstone bridge such that apparent strain is nulled.

2. The compensated strain gage of claim 1 in which the electrically insulating layer is $Al_2O_3$.

3. The compensated strain gage of claim 1 in which the electrically insulating layer is ceramically cemented to the substrate.

4. The compensated strain gage of claim 3 in which the electrically insulating layer is a non-electrically conducting ceramic cement.

5. The compensated strain gage of claim 1 in which the active gage is mounted on the insulating layer using a ceramic cement.

6. The compensated strain gage of claim 1 in which the compensating gage is tack-bonded to the insulating layer.

7. The compensated strain gage of claim 6 in which the compensating gage is tack-bonded to the insulating layer using a non-electrically conducting ceramic cement.

8. The compensated strain gage of claim 1 in which the means for maintaining the two gages at the identical temperature is a high temperature thermal blanket.

9. The compensated strain gage of claim 8 in which the thermal blanket is a woven Alumina-Boria-Silica fiber cloth.

10. A compensated high temperature strain gage for measuring strain in a substrate, comprising:
    an active strain gage;
    a compensating strain gage;
    an electrically insulating layer placed on the substrate;
    the active gage mounted on the insulating layer such that the active gage responds to mechanical strains caused in the substrate;
    the compensating gage mounted on the insulating layer in immediate proximity to the active strain gage such that it does not respond to mechanical stains caused in the substrate;
    a high temperature thermal blanket, the outer surface of which is flame sprayed with $Al_2O_3$ for maintaining the two gages at the identical temperature; and
    the two gages wired as adjacent arms of a Wheatstone bridge such that apparent strain is nulled.

* * * * *